United States Patent [19]

Ondercin et al.

[11] 4,058,711
[45] Nov. 15, 1977

[54] ASYNCHRONOUS DUAL FUNCTION MULTIPROCESSOR MACHINE CONTROL

[75] Inventors: Robert Michael Ondercin; Paul Stephen Borzcik, both of Cincinnati, Ohio

[73] Assignee: Cincinnati Milacron Inc., Cincinnati, Ohio

[21] Appl. No.: 677,712

[22] Filed: Apr. 16, 1976

[51] Int. Cl.² .................... G06F 15/46; G06F 15/16
[52] U.S. Cl. .................................. 364/101; 364/900; 364/104
[58] Field of Search ...................... 235/151.11, 151.1

[56] References Cited

U.S. PATENT DOCUMENTS

| 3,686,639 | 8/1972 | Fletcher et al. | 445/1 |
| 3,731,280 | 5/1973 | Shevlin | 445/1 |
| 3,827,030 | 7/1974 | Seipp | 235/151.11 X |
| 3,930,233 | 12/1975 | Morley et al. | 340/172.5 |

OTHER PUBLICATIONS

"Multiprocessor Concept Leads to PLC Hierarchies", Control Engineering, Jan. 1976, pp. 46 and 47.

Primary Examiner—Eugene G. Botz
Attorney, Agent, or Firm—C. Richard Eby

[57] ABSTRACT

A multiprocessor system is disclosed for controlling a cycle of operation of a machine. The cycle of operation of the machine is governed by a first set of devices and is monitored by a second set of devices. The multiprocessor system includes a logic processor unit containing a first program of logic instructions defining the cycle of operation of the machine. A bus and associated circuits are connected between the logic processor and the devices on the machine. The logic processor is responsive to the second set of devices and makes logic decisions in a continuous and cyclic manner to control the operation of the first devices thereby causing the cycle of operation of the machine to conform with the first program. The multiprocessor system further includes one or more independent data processors which are connected to the bus and operate asynchronously with the logic processor. The data processors respond to output signals from the logic processor which select preprogrammed sets of arithmetic instructions. The data processors execute the selected sets of arithmetic instructions and produce control signals which are accepted by the logic processor at the appropriate time in its own cycle of operation.

16 Claims, 8 Drawing Figures

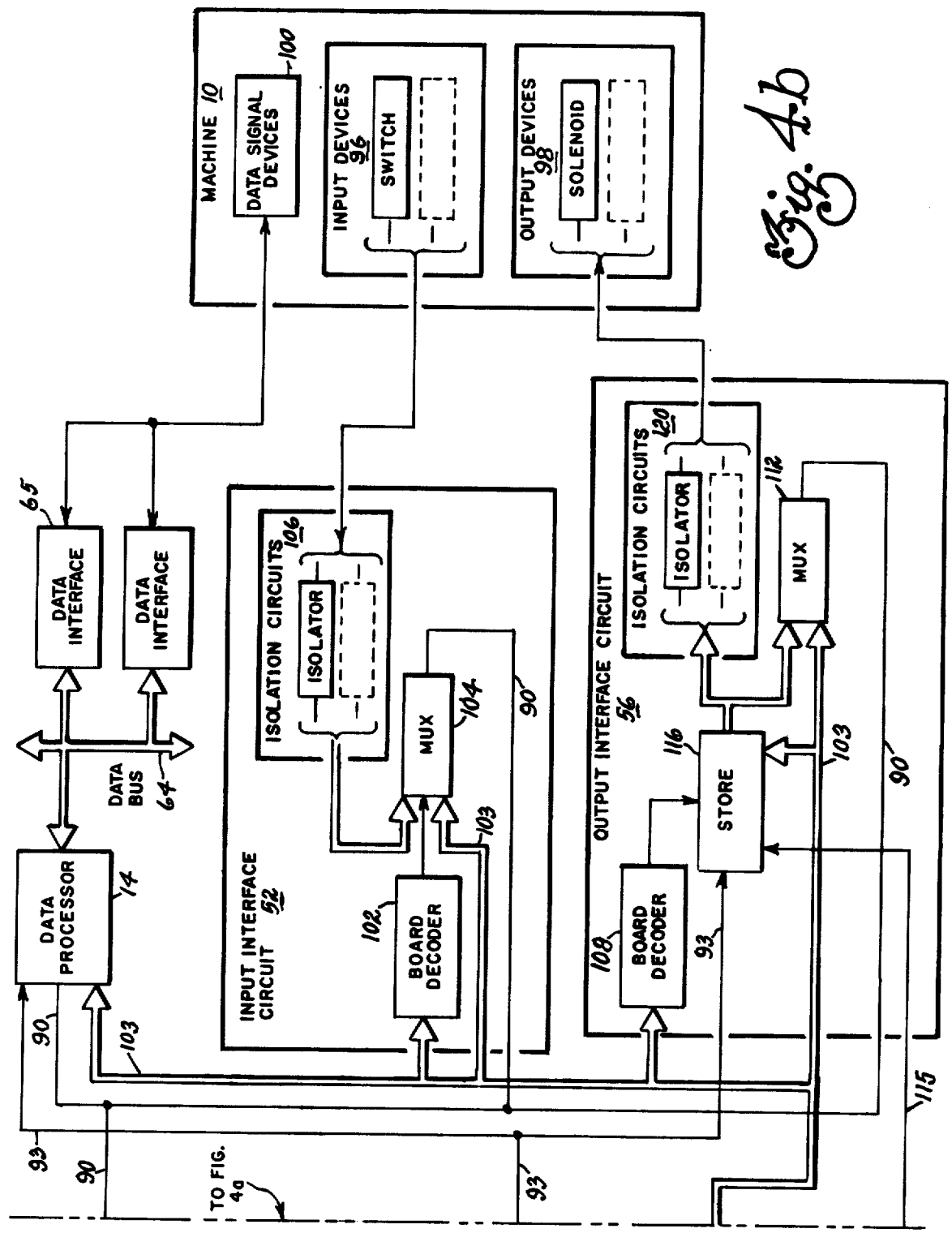
Fig. 4.b

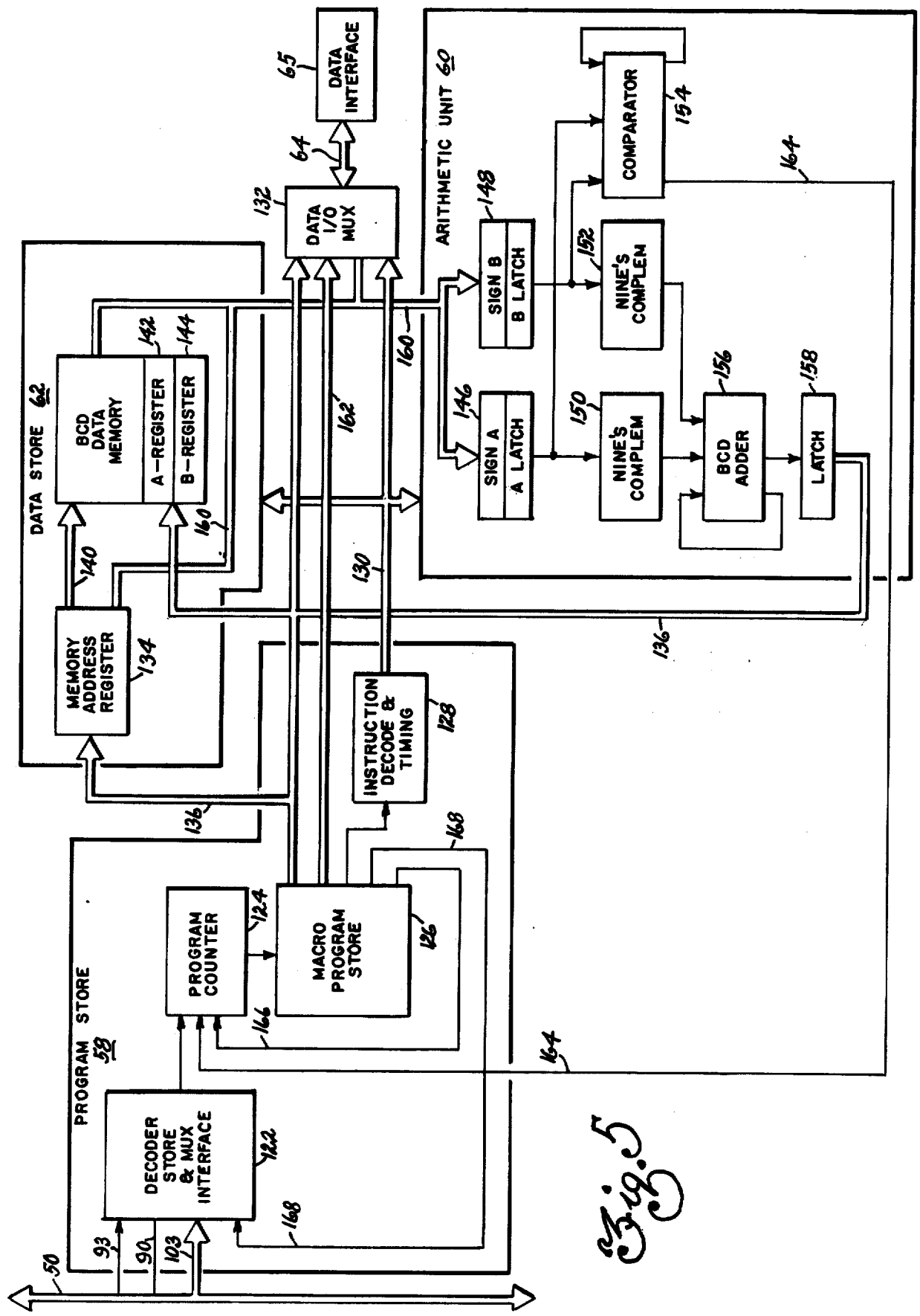

ASYNCHRONOUS DUAL FUNCTION MULTIPROCESSOR MACHINE CONTROL

BACKGROUND OF THE INVENTION

The invention relates generally to the area of machine controls; and specifically, the invention provides a logic processor in combination with asynchronously operating modular data processors. This multiprocessor combination may be used to control the cycle of operation of a machine.

Traditionally, relay circuits have been used to control output devices, e.g. motor starters, timers, lights, control valves, solenoids, displays, etc., in response to the condition of input circuits,, e.g. limit switches, pressure and temperature transducers, push buttons, etc. The output devices govern the operation of the machine in accordance with a logical pattern of conditions of the input devices monitoring the machine operation. The relay logic circuits are wired together to duplicate the desired logical pattern such that the circuits operate to control the output devices in a predetermined manner as a function of the condition of the input devices. The relay logic circuits require a mechanical operation to perform their switching operation; and therefore, the circuits are inherently less reliable than solid state electronic switching devices. Further, the relay circuits become expensive as the complexity of the machine control increases. Finally, relay circuits are rigid in their architecture and hence are limited in their versatility and expandability.

In the last five years, a number of logic processors have become available which replace the relay logic circuits for controlling machines. Some of the logic processors are very simple in their construction and only capable of duplicating the relatively simple logic decisions executed by the relay logic circuits. However, other controllers include full computer capabilities and perform the full range of arithmetic operations available in a computer as well as the standard logic decisions. A review of the prior art reveals that there is a full range of processor designs and programming techniques. However, the prior art devices have one thing in common, they are all single processing units. This is satisfactory in units only having logic decision making capabilities; however, when arithmetic operations are required in addition to the logic decisions, the processor becomes very complex and expensive.

The disclosed invention proposes to overcome the deficiencies of the prior art systems by providing a modular and expandable multiprocessing system having a logic processor for governing the cycle of operation of a machine in accordance with a programmed set of logic instructions. The system includes one or more independent data processors operating asynchronously with the logic processor for executing programmed sequences of arithmetic operations selected by the logic processor.

SUMMARY OF THE INVENTION

According to one embodiment of the invention, a dual function multiprocessor system is claimed for controlling the operation of a machine. The machine includes input devices for generating input signals representing operating conditions on the machine. Further, the machine includes output devices for governing the operation of the machine in response to output signals generated by the multiprocessor system. The multiprocessor system includes means for communicating the input and output signals between the devices on the machine and a logic processor. The logic processor is responsive to the input signals for producing output signals in response to the machine operating in accordance with a predetermined programmed sequence of logic instructions. The multiprocessor system further includes at least one data processor connected to the communicating means. The data processor asynchronously executes sets of programmed arithmetic instructions selected by the output signals. During the execution of the arithmetic instructions, the data processor produces control input signals back to the bus for use by the logic processor.

BRIEF DESCRIPTION OF THE DRAWINGS

FIGS. 4a and 4b when joined along the indicated junction line illustrate a detailed block diagram of the logic processor.

FIG. 5 illustrates a detailed block diagram of the data processor.

DESCRIPTION OF THE PREFERRED EMBODIMENT

Figure 1:
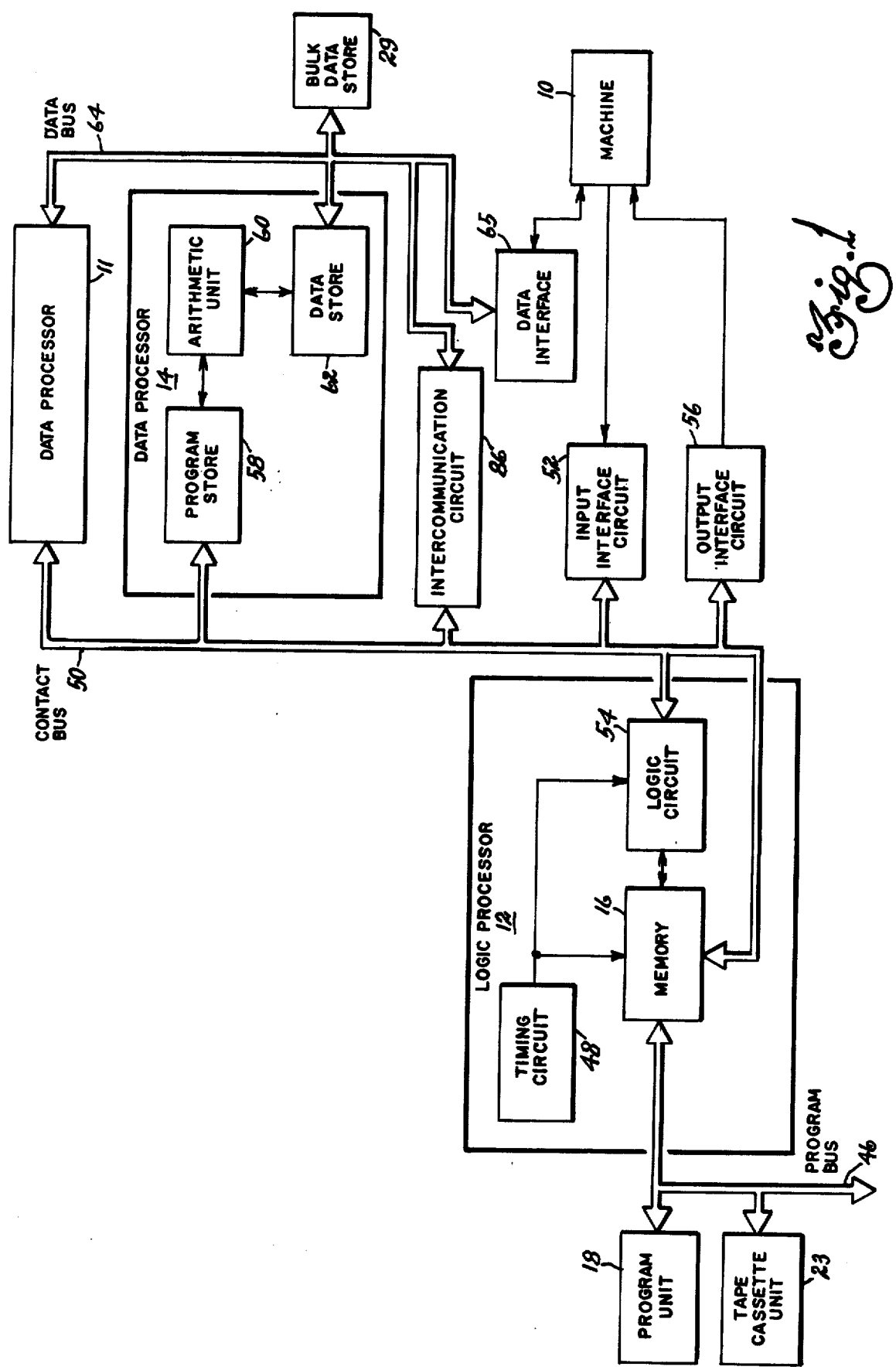
FIG. 1 is a general block diagram illustrating the disclosed multiprocessor system.

FIG. 1 is a general block diagram illustrating the multiprocessor system. Within FIG. 1, a machine 10 is controlled by a multiprocessor system comprised of a logic processor 12, one or more data processors 11 and 14, and a contact bus 50 for communicating signals between the logic processor and the machine and between the logic processor and the data processors. The data processors are identical in construction and theory of operation. Therefore, from this point on in the specification, only one data processor will be described in detail; however, even though only one data processor is described, one or more data processors will be implied. The operation of the machine is represented by a number of logic instructions defined by the memory words in the memory 16 of the logic processor 12. The memory words are programmed by using a programming unit 18. There is a wide variety of formats which may be used for the memory word. Further, there is an equally wide variety of programming units available for generating the memory words. For purposes of this disclosure, it is sufficient to illustrate one example of a programming unit and the memory word generated thereby.

Figure 2:
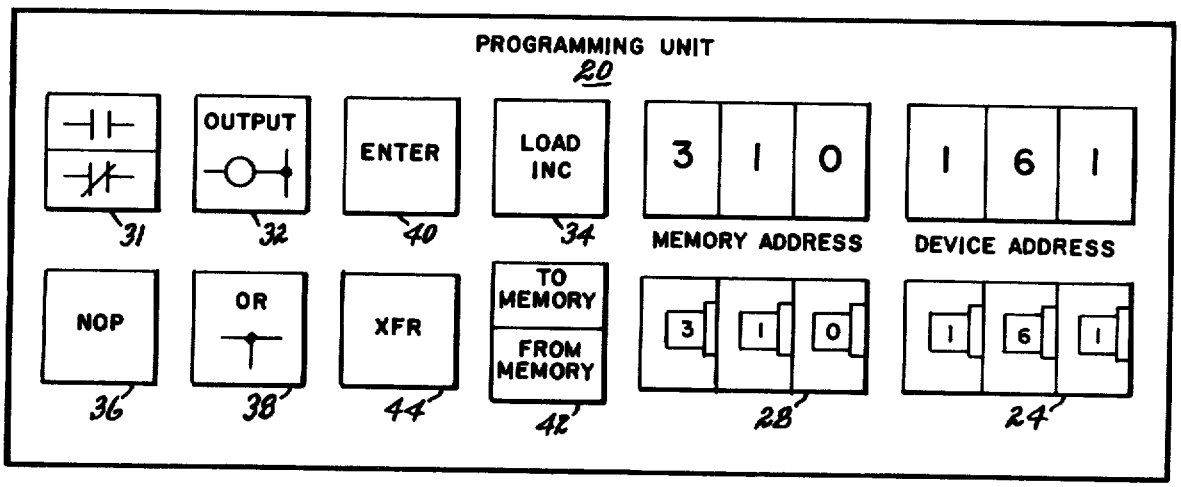
FIG. 2 illustrates a typical selection of controls for a programming unit used in conjunction with the logic processor.
Figure 3:
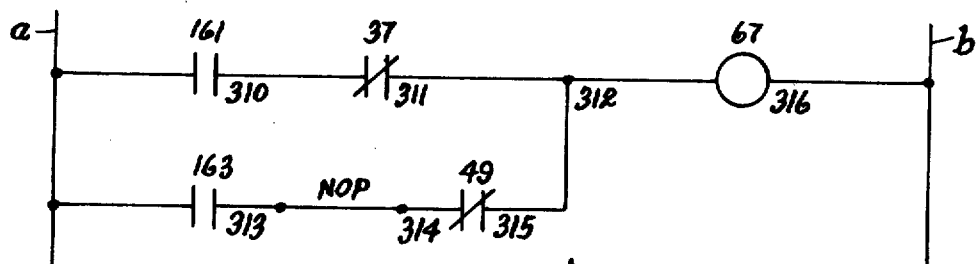
FIG. 3 illustrates some of the basic elements which comprise a typical machine control circuit or ladder diagram.

FIG. 2 illustrates a pushbutton panel for a programming unit that may be used to generate the memory words for the logic processor 12. The programming unit 18 is designed to be used with a relay circuit diagram otherwise known as a ladder diagram. These diagrams are generally used to illustrate machine control circuits. Further, the complexity of the logic is a function of the machine cycle. An example of such a diagram is shown in FIG. 3. As will be appreciated by those who are skilled in the art, FIG. 3 only represents an elementary example of a machine control circuit. Typically, such circuits consume many sheets of drawings; however, any size circuit can be programmed in terms of the elements discussed below. Power is supplied to the vertical lines $a$ and $b$, and the circuits elements define a logical sequence of operations. The purpose of the programming unit 18 of FIG. 2 is to generate a sequence of logic instructions which simulate the logical sequence of operations of the circuit of FIG. 3. The circuit is comprised of several basic elements—normally open or normally closed input contacts, an AND function, an OR function, an output coil and a no operation performed function (NOP). Further, the input contacts and output coil have unique device address identifiers.

A typical sequence of memory words is shown in Table I below.

TABLE I

| Memory Location | Element NOP - 00 Output - 01 Input - 10 OR - 11 | | Contact State NO - 0 NC - 1 | Device Address Allocation 0-127 - External Coil Out. 128-255 - External Con. In. | | | | | | | |
|---|---|---|---|---|---|---|---|---|---|---|---|
| 309 | . | . | . | . | . | . | . | . | . | . | . |
| 310 | 1 | 0 | 0 | 1 | 0 | 1 | 0 | 0 | 0 | 0 | 1 |
| 311 | 1 | 0 | 1 | 0 | 0 | 1 | 0 | 0 | 1 | 0 | 1 |
| 312 | 1 | 1 | 0 | 0 | 0 | 0 | 0 | 0 | 0 | 0 | 0 |
| 313 | 1 | 0 | 0 | 1 | 0 | 1 | 0 | 0 | 1 | 0 | 1 |
| 314 | 0 | 0 | 0 | 0 | 0 | 0 | 0 | 0 | 0 | 0 | 0 |
| 315 | 1 | 0 | 1 | 0 | 0 | 1 | 1 | 0 | 0 | 0 | 1 |
| 316 | 0 | 1 | 0 | 0 | 0 | 1 | 0 | 0 | 0 | 1 | 1 |
| 317 | . | . | . | . | . | . | . | . | . | . | . |

The memory location in the left hand column defines the memory location in the programming unit. Associated with each memory location is a binary expression defining each element in the circuit of FIG. 3. Several points should be noted at this time. First, the number of elements defined in the circuit is totally arbitrary. The elements defined herein represents a very simple combination. However, they are sufficient to define most machine control circuits. Second, the length of the memory address word is totally arbitrary. In the present example, an 11-bit word is used. However, the length of the word may be expanded to accomodate an expanded number of inputs and outputs, additional element definitions, e.g. auxiliary timer functions, and circuit elements of greater versatility, e.g. multiple data processors, intercommunications functions, etc.

Before the actual programming begins, the circuit in the example of FIG. 3 must be reviewed. As a programming convenience, a memory location number is assigned to each element. In the example of FIG. 3, these numbers range from 310 to 316 and appear to the lower right of each element. Next, each input contact and output coil must be assigned a unique device address. In the preferred logic processor disclosed herein, device addresses are assigned as a function of the character of the element. For example, output coils which have contacts connected to the contact bus and which directly govern some machine operation may have device address numbers 0 through 127. External contact inputs which are generated on the machine and produce input signals back to the logic processor may be assigned device address numbers 128 through 255. After the memory locations and device addresses have been assigned, the programming unit of FIG. 2 may be used to generate the desired program of logic instructions.

The first programming step is to dial in the first memory location using the switches 28. Depressing the load push button 34 causes the programming unit to address a location in an internal memory corresponding to the address location set in the switches 28. Further, this location is indicated by the visual display 30. In FIG. 3, the first memory location is 310. Therefore, this number is set in the switches 28, and the load button depressed thereby causing the number 310 to appear at the display 30. Next, the contact address 161 is set in the switches 24. The switch 31 is used to define whether or not the contact is normally or normally closed. Thereafter, the enter push button 40 is depressed which causes a memory word to be loaded in the selected memory location of the programming unit memory. Referring to the Table I above, opposite memory location 310, the first eight bits of the memory word define the device address of the contact 161. The magnitude of the device address indicates that 161 represents a signal generated on the machine which is transferred as an input to the control circuit. Bit nine defines whether or not the contact is normally open or normally closed. Bits 10 and 11 define the function of the element.

In the preferred embodiment, after the enter button has been depressed, the memory in the programming unit automatically increments to the next memory location. Further, the contents of the new location are displayed on the programming unit. For example, if the location contains a device address, this address will be indicated by the display 26. If an element is defined, in the memory location, one of the push buttons 30, 32, 36 or 38 will illuminate to define said element.

In continuing with the program, the device address 37 is entered in the switching unit 24; the push button 31 is exercised to define a normally closed contact; and the enter push button 40 is depressed. Consequently, a binary memory word is entered in memory location 311 as indicated in Table I. The appropriate inputs are selected for each successive memory location. After the entire circuit of FIG. 3 has been programmed, memory locations 310 through 316 of the memory of the programming unit will contain a sequence of binary memory words indicated in Table I. At this point, the push button 42 is exercised to select the to-memory position, and the transfer button 44 is depressed. This causes the contents of the memory in the programming unit to be transferred via the program bus 46 to the memory 16 of the logic processor 12 shown in FIG. 1.

Several points should be noted. FIrst, the NOP element may be inserted at random throughout the circuit diagram. This allows the circuit to be changed, and elements added without extensive reprogramming. Second, many programming units contain diagnostic features. For example, one diagnostic mode may check for continuity along each branch of the circuit, however, since the diagnostic features are not important to the present invention, they will not be discussed further. Third, the programming unit only represents one program source. The program may already exist and be stored in any one of a number of mediums. For example, the program may be stored in a magnetic tape cassette. In this case, a tape cassette unit 23 of FIG. 1 may be used to load the program in the memory 16 via the program bus 46.

After the program has been transferred to the memory of the logic processor 12, the logic processor sequentially by means of a timing circuit 48 transfers bits 9 through 11 of each memory word to a logic circuit 54.

Simultaneously, the associated device address defined by the first eight bits of the memory word is transferred to the contact bus 50. In the example of FIG. 3, when the memory location 310 is read, an input circuit 52 decodes the device address 161 and transfers back to the contact bus an input signal representing the state of the input device on the machine corresponding to the device address. The logic circuit 54 is operative to store a first signal if the actual machine conditions correspond to the desired machine conditions for contact 161 in the circuit branch.

In other words, if the input signal indicates the input device is energized and the memory word defines a normally open contact, continuity exists; and the first signal is stored. Similarly, if the input signal indicates the input device is deenergized and the memory word defines a normally closed contact, continuity exists; and the first signal is stored.

Next, memory location 311 is read and device address 37 is transferred to the contact bus. The input circuit 52 decodes this address and produces another input signal representing the state of the newly addressed input device. If the input signal indicates that the actual and desired machine conditions correspond for this addressed contact, and if continuity was established through the previous contact, the first signal representing continuity is maintained. However, if the continuity is broken, the first signal is terminated. Further, if continuity was not established through the previous contact, the first signal representing continuity cannot initially be established by continuity through a subsequent contact. Therefore, beginning with the first contact 310 in the branch, the logic circuit checks for continuity serially along the branch. Consequently, the logic circuit 54 operates to execute a logical AND function.

As long as the logic circuit 54 detects continuity along the branch, it remains energized. If there is a loss of continuity, the logic circuit 54 is deenergized until an OR element or an output element signal is read. Upon detecting either of these, the logic circuit 54 is reset; and at the beginning of the next branch again begins checking for continuity. If continuity exists when OR element 312 is read from memory, the logic circuit 54 is held energized until output element 316 is decoded. If continuity is maintained until a memory location identifying output element 316 is decoded, the output signal produced by the logic circuit to the contact bus 50 is switched to its energized state. This signal and the device address of the output coil is detected and decoded by the output circuit 56 which operates to energize an output device on the machine corresponding to the device address.

As will be appreciated by those who are skilled in the art, the program of logic instructions represents a Boolean expression defining the logical operation of the circuit. As long as the Boolean expression associated with an output coil is satisfied, the output coil is energized. However, when the logic circuit fails to detect continuity along any of the branches associated with the output coil, its output signal is switched to its deenergized state; and the associated output coil is deenergized.

From the above description, it is readily apparent that the logic processor 12 is a logic controlled fixed sequence processor which continuously monitors a correspondence between the desired machine conditions as represented by the memory words and the actual machine conditions as represented by the input signals from the machine. If correspondence occurs, output devices are energized as called for by the program. If correspondence does not occur, the output devices will not be energized. The processor 12 as a stand-alone device is operative to control the operation of many relatively simple machines. However, as the complexity of the machine operation increases, the need for more intelligence in the processor arises. Therefore, the disclosed invention provides an independent asynchronously operating data processor 14 to be used in conjunction with the logic processor 12 for performing arithmetic instruction.

Referring to FIG. 1, data processor 14 is comprised of a program store 58, an arithmetic unit 60 and a data store 62. The data store contains numerical data signals which are related to the operation of the machine. The data signals may be preprogrammed before the machine operation begins, or the arithmetic unit 60 may instruct the data store 62 to retrieve data from the machine on a real time basis via the data bus 64 and data interface circuit 65. The program store contains one or more programs which define a sequence of arithmetic instructions which are relevant to some portion of the cycle of operation of the machine. A particular program in the program store 58 is selected by an output signal generated by the logic circuit 54 of the logic processor. Once the program has been selected, the data processor 14 operates asynchronously from the logic processor 12 to execute the selected program. The arithmetic unit 60 is responsive to the selected program and utilizes the appropriate data signals from the data store 62 to perform the predetermined arithmetic operations. The selected program also causes the data processor 14 to provide appropriate control input signals to the contact bus 50. The logic processor 12 continues to operate in its fixed iterative manner; and when the memory 16 produces a device address associated with a control input signal, the input signal is transferred to the logic circuit 54 where it is used as a typical input signal in a manner as previously described.

It should be noted at this point that if multiple data processors are used, data store 62 may be used in conjunction with or may be replaced by a bulk data store 29. The bulk data store 29 may be implemented by any one of a number of commerically available storage units. Further, the contact bus 50 and the data bus 64 separate the machine contact information from the machine data information; and in certain special applications, the logic processor may during its cycle of operation, be required to transmit or receive data signals to or from the data processor 14. To accomplish this, an intercommunication circuit 86 is provided which communicates with the logic processor via the contact bus one bit at a time. Further, the circuit 86 transposes the single bit input signals into multiple bit data signals and vice versa.

Consequently, FIG. 1 illustrates a logic processor which is dedicated to controlling the cycle of operation of a machine. The logic processor only executes logic decisions and is incapable of performing arithmetic operations. A contact bus is connected between the logic processor and the machine and carries only single bit binary contact information. If arithmetic operations are required, the logic processor generates an output signal which is decoded by the data processor and is operative to select a stored program of arithmetic instructions in the data processor. A data bus connects the data processor to the data signal devices on the machine and only conducts the multiple bit data signals. While the data processor executes the arithmetic instructions, the logic processor continues through its sequential cycle of operation. At times determined by the stored program, the data processor produces input signals back to the contact bus for use by the logic processor. These signals are accepted by the logic processor at a point in its cycle of operation with their corresponding device address are produced on the contact bus. Therefore, FIG. 1 illustrates a modular asynchronous dual function multiprocessor system comprised of a logic controlled fixed sequence logic processor connected by a contact bus to the machine and one or more program-controlled sequential data processors which are connected by a data bus to the machine.

Figure 4A:
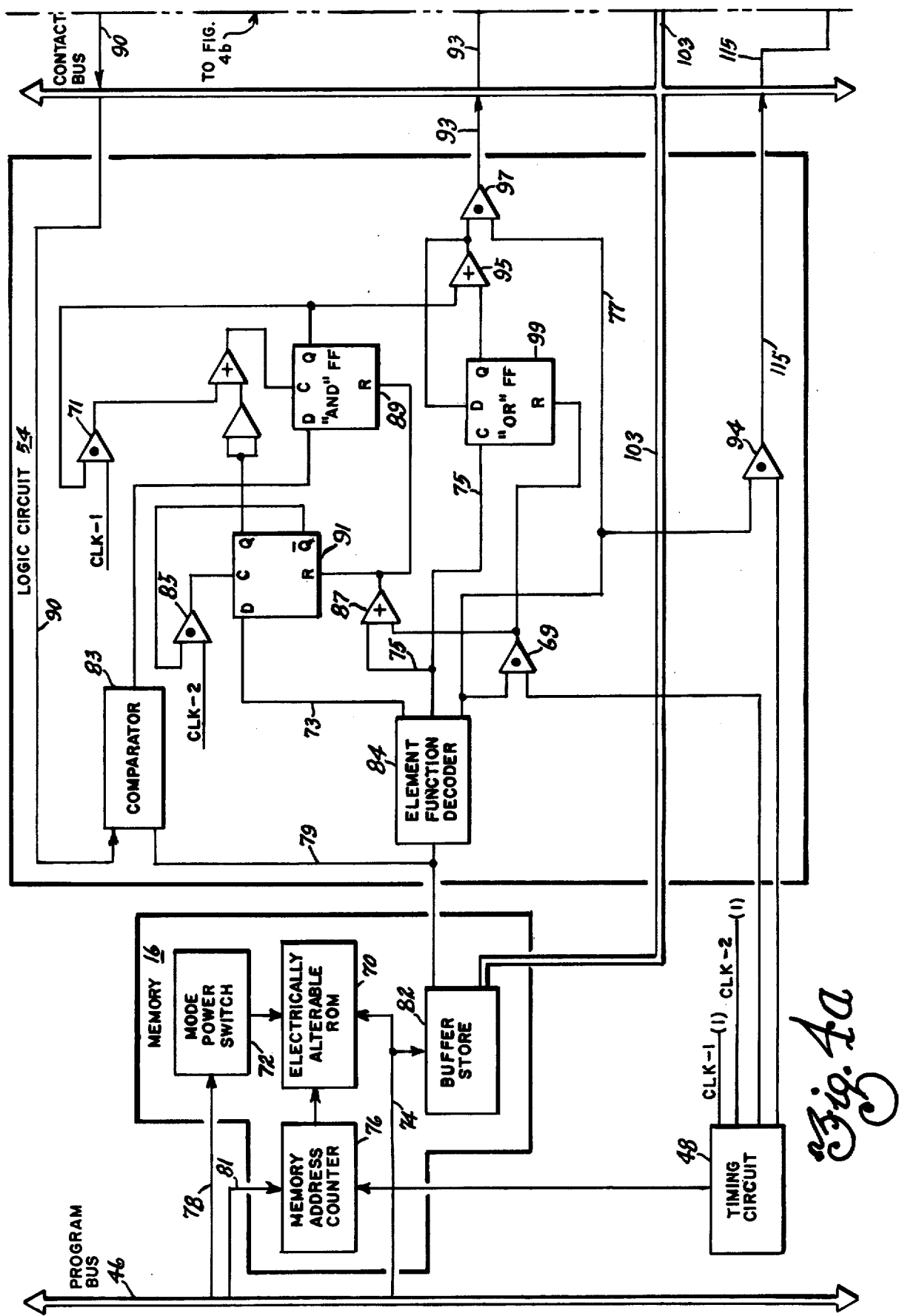

FIGS. 4a and 4b when joined along the indicated junction line illustrate a detailed block diagram of the elements of the logic processor 12 and interface circuits 52 and 56 shown in general in FIG. 1. In FIG. 4a, the memory 16 is comprised of a nonvolatile electrically alterable read-only-memory 70, a mode power switching circuit 72, a memory address counter 76 and a buffer store 82. Memory words are written in and read from the memory 70 via line 74. After the programming unit 20 shown in FIG. 2 has been programmed, the transfer-to-memory controls thereof are operative to supply a memory word via line 81 to the memory address counter 76. Further signals are provided on line 78 to the mode power switching circuit 72 to determine the operating mode, e.g. read, write or erase, of the memory 70. The memory address counter 76 is responsive to timing signals from a timing circuit 48 for transferring the memory words from the programming unit 20 to the memory 70 on the line 74 via the program bus 46. After the memory 70 has been loaded with a program, the mode power switching circuit 72 switches it to a read mode; and the timing circuit 48 is operative to cause the memory address counter 76 to continuously and iteratively read sequential memory words from the memory 70. As each memory word is read, it is transferred to a buffer store circuit 82.

Various bits of each memory word are gated to different circuit elements as a function of the information represented by said bits. For example, the first eight bits of each memory word define a device address which is output to the contact bus 50. As will be described later, the device address is decoded by an interface circuit. Further, consistent with the example recited earlier, the last two bits, i.e. bits 10 and 11, of the memory word are input to an element function decoder 84. The outputs from the function decoder 84 determine which of the four possible elements are associated with the device address. The decoder is operative to produce an input element signal on line 73, an OR element signal on line 75, or an output element signal on line 77. Bit 9 of the memory word is an input to a comparator 83. The other input to this circuit is an input signal on the contact status line 90 from the contact bus 50. The input signal defines the electrical status of the input or output device selected by the device address. The comparator 83 switches a first signal to a continuity state if the actual condition of the addressed input or output device corresponds to the programmed condition of said device.

For example, if the memory word defines a normally open contact and the input signal represents an energized condition of the addressed input or output device, the comparator 83 switches the first signal to a continuity state. Likewise, if the memory word defines a normally closed contact and the input signal indicates that the addressed input or output device is deenergized, the comparator 83 again produces the continuity state of the first signal. Under other circumstances, the comparator 83 holds the first signal in state representing non-continuity.

Assume the memory has read a memory word representing the first contact element in a circuit branch, the element function decoder 84 will produce an input element signal on line 73 connected to an input of the flip-flop 91. The flip-flop 91 will have been previously reset by a master reset signal (not shown) or a reset signal from the OR gate 87. The OR gate 87 will produce a reset signal in response to an OR element signal on line 75 or an output element signal on line 77. An AND gate 85 is connected to the clock input of flip-flop 91. The AND gate 85 has one input responsive to a CLK-2 signal produced by the timing circuit 48. It should be noted that the CLK-1 and CLK-2 signals are generated by the timing circuit once during each memory word but after the comparator 83 and element function decoder 84 have generated their signals, if any. Further, the CLK-1 signal will occur before the CLK-2 signal. After the flip-flop 91 is reset, the other input of the AND gate 85 will be in a state which allows the CLK-2 signal to clock the flip-flop 91. If there is no input element signal on the input of flip-flop 91, its output will not change state. If an input element signal occurs on the input of the flip-flop 91, this state will pass through to the Q-output of the flip-flop 91. The $\overline{Q}$-output will also change state thereby prohibiting any further clocking of the flip-flop 91 by the CLK-2 signal.

The flip-flop 89 is reset by the same signal which reset flip-flop 91 and is initially in a condition such that the AND gate 71 inhibits the passage of the CLK-1 signal. However, when the Q-output of the flip-flop 91 changes state, it operates to clock the flip-flop 89. The input to flip-flop 89 is connected to the output of the comparator 83. If the first signal from the comparator 83 is in its non-continuity state when the flip-flop 89 is clocked, the Q-output of the flip-flop 89 does not change state. Further, the outputs of the flip-flops 91 and 89 will be such that the AND gates 85 and 71 inhibit any further clocking of these flip-flops. Therefore, until they are again reset, the output signal from the logic circuit 54 will remain deenergized.

If the first signal from the comparator 83 is in its continuity state when the Q-output of the flip-flop 91 changes state, this state of the first signal is clocked through to the Q-output of the flip-flop 89. This output removes the inhibit from the AND gate 71. Therefore, when the next memory word is read and another input signal is generated on line 90, if the comparator 83 detects continuity through the contact defined by this subsequent memory word, the CLK-1 signal will cause the flip-flop 89 to again clock the continuity state of the first signal from the comparator 83 to its Q-output.

The circuit continues to sequentially read each memory word; and if at any time the comparator 83 fails to detect continuity, the non-continuity state of the first signal from the comparator 83 will be clocked to the Q-output of the flip-flop 89 thereby inhibiting further clocking of the flip-flop 89 and holding the output signal in a deenergized state. Thus, it can be seen that the comparator 83 and flip-flops 91 and 89 operate to execute a logical AND function. The result of this AND function is represented by the Q-output of the flip-flop 89, and therefore, the flip-flop 89 will be referred to as the "AND" flip-flop.

If a memory word is decoded which contains an OR element signal, this signal is operative to transfer the state of the first signal from the "AND" flip-flop 89 into the "OR" flip-flop 99. Further, the OR element signal is operative to reset the flip-flops 91 and 89 via the OR gate 87. If the continuity state of the first signal is stored in the flip-flop 89, and this state is clocked into the flip-flop 99, continuity has been established along one branch of the circuit. Even though the "AND" flip-flop 89 will continue to detect continuity along parallel branches, the result in unimportant since continuity has been established along one of the branches. When a memory word is decoded which contains an output element signal, the beginning of the output element signal is detected by one input of the AND gate 97. Another input of the AND gate 97 is responsive to the output of the OR gate 95 which is responsive to the Q-outputs of the flip-flops 89 and 99. If either of these flip-flops are storing the continuity state, the output signal on the line 93 is switched to its energized state.

Further, an output strobe signal is generated to the contact bus 50 via the gate 94 in response to each output element signal read from the memory. As will subsequently be described in more detail, the interface circuits use the output strobe signal to clock the state of the output signal into an address store. At the end of the output element signal, which is determined by the output from AND gate 69, the flip flops 91, 89 and 99 are reset, and the continuity check begins again.

In summary, in response to the occurrence of each memory word defining an input element, the state of the first signal stored in the "AND" flip-flop 89 determines whether or not continuity exists along a circuit branch. The reading of a memory word containing an OR element signal will cause the state of the first signal in the "AND" flip-flop 89 to be stored in the "OR" flip-flop 99. If the continuity state of the first signal is stored in either of the flip-flops 89 or 99 when an output element signal occurs, the output signal on the line 93 will be switched to its energized state. It will remain energized until the interface circuits are able to respond to its energized state and the output strobe signal from the gate 94. At the end of the output element signal, the output signal 93 is switched to its deenergized state by the resetting of the flip-flops 91, 89 and 99.

In FIG. 4b, the machine 10 contains input devices 96, output devices 98 and data signal devices 100. The elements of the input interface circuit 52 and output interface circuit 56 are also shown. It should be noted at this point that the interface circuits 52 and 56 may be comprised of a number of boards each of which contain sets of identical elements. For example, each input circuit board contains a broad decoder 102, multiplexer 104 and isolation circuits 106. Similarly, each output circuit board contains a board decoder 108, store 116, a multiplexer 112 and isolation circuits 120. To simplify the explanation, the interface circuits 52 and 56 only illustrate the components of a single input circuit board and output circuit board, respectively.

Upon the buffer store 82 supplying the device address on address line 103 of the contact bus 50 in combination with the occurrence of an input element signal, the board decoder circuit 102 within the input interface circuit 52 receives the device address bits 4 through 7 on line 103. These bits select the particular input circuit board associated with the desired input device. The device address bits 1 through 3 are input to the multiplexing circuit 104 and operate to select the particular isolator within the isolation circuits 106 which is connected to the input device associated with the device address. The condition of the input device is transmitted through the selected isolator to the multiplexer 104 which produces an input signal on contact status line 90 of the contact bus 50 defining the condition of the addressed input device.

In a similar manner, the output interface circuit 56 includes a board decoder 108 which is responsive to bits 4 through 7 of the device address signal on address line 103. The board decoder 108 responds to the device address to energize the store 116. Further, bits 1 through 3 of the device address are input to the multiplexer 112. These address bits select one of a number of isolators within the isolation circuits 120 on the addressed board. During each cycle of the program in the logic processor, every time an output element signal is decoded, an output strobe signal is generated by AND gate 94 of FIG. 4a. The output strobe signal is received by the store 116 on line 115. Further, if the output signal is in its energized state, the store 116 is operative to receive and store the energized state of the output signal via the line 93. The store 116 is then operative to energize a selected isolator which in turn activates the one of the output devices 98 directly connected to the selected isolator. The output device remains activated until a subsequent cycle of the logic processor switches the output signal to its deenergized state. Consequently, the operation of the machine is controlled by the output element signals in accordance with the logic instructions defined by the stored program.

As discussed earlier the logic processor is used in combination with an asynchronously operating data processor which is connected to the logic processor by the contact bus 50. FIG. 5 is a detailed block diagram of the data processor 14 shown in FIG. 1. The decoder, store and multiplexing interface circuit 122 is connected to the contact bus 50 and is operative to decode unique device addresses received on the address line 103. The interface circuit 122 responds to the energized state of the output signal and an output strobe signal to temporarily store the unique device address. Further, in response to other unique device addresses, the interface circuit 122 is operative to multiplex input signals back to the logic processor via the contact status line 90 of the contact bus 50. Since the interface circuit 122 functions in a manner similar to the input and output interface circuits 52 and 56, it will not be described in further detail.

When the logic processor produces one of the unique device addresses in combination with the output strobe signal and the energized state of the output signal, the interface circuit 122 decodes the device address and presets a number into a program counter 124. The state of the program counter is operative to address the desired program in the macroprogram store 126 which is typically a programmable read-only memory (PROM). The store 126 contains a number of programs which define a number of arithmetic instructions using data relative to the operation of the machine. Therefore, a particular program is selected by a memory word in the logic processor which defines an output element having an address decodable by the interface circuit 122. While the data processor is executing the selected program, the logic processor continues through its sequential and iterative cycle of operation; and therefore the processors operate asynchronously. During the data processor's operation, it will produce a control input signal. When the logic processor reads a memory word representing an input element having a device address corresponding to the address of the control input signal, the control input signal is transferred to the logic processor via the contact status line 90 of the contact bus 50. The logic processor uses the control input signal in a manner as previously described relative to the other input signals.

The instructions in the selected program in the macroprogram store 126 are reduced to a series of microinstructions and timing signals by the instruction decode and timing circuit 128. These microinstruction and timing signals are transmitted via a control and timing bus 130 to the data store 62, arithmetic unit 60 and data I/O multiplexer 132. A binary coded decimal (BCD) data memory 138 contains a number of memory locations for storing numerical data which may be established during the set-up of the machine cycle of operation. These memory locations are addressed via a memory address bus 140 from a two digit memory address register 134 which is directly latched by a signal on the output data bus 136 from the macroprogram store 126. The BCD data memory also contains two dedicated storage locations—A-register 142 and B-register 144. These registers store the data signals being used by the arithmetic unit 60.

The arithmetic unit 60 operates in BCD and includes an A-latch 146, a B-latch 148, nines complementing circuits 150 and 152, a comparator 154, a BCD adder 156 and latch 158. The A and B latches 146 and 148 of the arithmetic unit may receive data on a data input bus 160 from the memory address register 134, data memory 138 or data I/O multiplexer 132. The multiplexer is connected to the data bus 64 which transfers data signals to and from the data signal devices 100 on the machine 10 by means of the data interface 65.

The data signal devices 100 shown in FIG. 4b may take the form of pressure or temperature transducers, position or velocity transducers, feedback or error signals for control mechanisms, communications modules, etc. The data interface 65 contains circuits which are compatible with the type of data signal device used. Typically, the interface will be embodied by digital-to-analogue converters analogue-to-digital converters, digital-to-frequency converters, frequency-to-digital converters, etc. Finally, the macroprogram store may directly address data signals via the address output bus 162.

Several other functions should be noted. The program counter 124 may be controlled by signals on lines 164 and 166. The signal on line 166 from the macroprogram store 126 will cause the program counter to jump to a state associated with a jump instruction. The signal on line 164 from the comparator 154 of the arithmetic unit indicates a comparsion exists and generally causes the program counter to skip the next instruction (typically a jump instruction). During the execution of a program, a control input signal is generated by the macroprogram store 126 on line 168 to the interface circuit 122. The interface circuit 122 waits for the logic processor to produce a device address associated with the control input signal afterwhich it transfers the control input signal to the logic processor via the contact bus.

The following is a list of typical instructions that may be used in writing a program stored in the macroprogram store 126:

JMP—jump a number of macroinstruction addresses as defined by a programmed number associated with the jump instruction.

SMAU, SMAL—set the memory address register to a number having a most significant digit defined by a number programmed in association with the SMAU instruction and a least significant digit defined by a number programmed in association with the SMAL instruction.

ATC,BTC—set the memory address register equal to the least two significant digits of the selected A or B register.

CTA,CTB—load the selected A or B register with the contents of the memory address register.

MTA,MTB—move the data at the address location specified by the memory address register to the selected A or B register.

ATM,BTM—move the contents of the selected A or B register to the address location specified by the memory address register.

CLA,CLB—clear the selected A or B register.

INA,INB—increment the selected A or B register.

DCA,DCB—decrement the selected A or B register.

SLA,SLB—shift the selected A or B register left one character.

SRA,SRB—shift the selected A or B register right one character.

CZA,CZB—compare the selected A or B register to zero; and if equal, skip the next instruction; if not equal, do the next instruction.

TSA,TSB—test the sign of the selected A or B register; and if plus, skip the next instruction; if minus, do the next instruction.

CSA,CSB—change the sign of the selected A or B register to the opposite sign.

ADD—add the contents of the A register and the contents of the B register and put the sum in the A register.

SUB—subtract the contents of the B register from the contents of the A register and put the difference in the A register.

CMG—compare the magnitude of the A register and the B register; and if A is equal to or greater than B, skip the next instruction. If A is less than B, do the next instruction.

CME—compare the magnitude of the A register with the B register; and if they are equal, skip the next instruction. If they are not equal, do the next instruction.

SCC—set the bit specified by the number programmed in association with SCC instruction. (Control input signal energized).

RCC—reset the bit specified by the number programmed in association with RCC instruction. (Control input signal deenerigzed).

NOP—no operation performed.

As mentioned earlier, the data processor operates with binary coded decimal (BCD) data signals. Each BCD data signal is comprised of a sign digit and seven numerical digits. For each macroinstruction required in an arithmetic operation, the instruction decode and timing circuit 128 produces signals which require nine passes through the arithmetic unit to process one BCD data signal. During the first pass through the arithmetic unit, the sign digit is read. During the second through eighth passes, the arithmetic unit operates on the seven numerical digits; and on pass number nine, the sign of the data signal resulting from the execution of the programmed instruction is determined and stored. The instruction decode and timing circuit 128 contains a read-only memory (not shown) for decoding each instruction in the macroprogram store into a number of microinstructions. In the preferred embodiment, each microinstruction is comprised of an eight bit word. The three least significant bits define which one of a number of arithmetic operations is to be performed, e.g. compare to zero, compare A to B, shift right, shift left, increment or decrement, subtract, no operation, etc. Another two bits in the microinstruction may be used to provide modal instructions. e.g. read or write, input or output, no operation, etc. Further, other bits may be used to provide address instructions, e.g. A-register, B-register, MAR register, etc.

In the preferred embodiment, eight microinstructions are defined. Further, these microinstructions are associated with the passes as indicated by the Table II shown below.

TABLE II

MICROINSTRUCTION DEFINITIONS

| Pass | Micro-Instructions | Operation |
|---|---|---|
| 1 | ROM 0 | Fetch Sign B |
| 1 | ROM 1 | Fetch Sign A |
| 2-8 | ROM 2 | Fetch Data B |
| 2-8 | ROM 3 | Fetch Data A |
| 2-8 | ROM 4 | Modify (Arithmetic Unit), Write |
| 9 | ROM 5 | Fetch Sign B |
| 9 | ROM 6 | Fetch Sign A |
| 9 | ROM 7 | Modify (Arithmetic Unit), Write |

As will be appreciated by those who are skilled in the art, the exact operation of each microinstruction is specifically defined by the states of the eight bits comprising the microinstruction word.

In order to implement the microinstructions, each pass through the arithmetic unit is divided into nine timing counts. The Table III below identifies each count numerically and the operation performed thereby. Further, the microinstruction operated on by each count is defined in association with the particular pass in which the microinstruction is used.

TABLE III

COUNT DEFINITIONS

| Count | Operation | Pass 1 ROM | Passes 2-8 ROM | Pass 9 ROM |
|---|---|---|---|---|
| 1 | Read and Decode Microinst. | 0 | 2 | 5 |
| 2 | Execute Microinstruction | 0 | 2 | 5 |
| 3 | Read and Decode Microinst. | 1 | 3 | 6 |
| 4 | Execute Microinstruction | 1 | 3 | 6 |
| 5 | Read and Decode Microinst. | | 4 | 7 |
| 6 | Execute, i.e. Modify in Arithmetic Unit | | 4 | 7 |
| 7 | Execute, i.e. Modify in Arithmetic Unit | | 4 | 7 |
| 8 | Latch in Arithmetic Unit | | 4 | 7 |
| 9 | Write in appropriate location | | 4 | 7 |

To clarify the operation of the data processor, an example of a simple instruction will be discussed. Referring to FIG. 5, upon an ADD instruction in the macroprogram store 126 being decoded by the instruction decode and timing circuit 128, timing signals are generated to initiate a first pass through the arithmetic unit. On count 1 of pass 1, microinstruction ROM 0 is read and decoded, i.e. the memory address register selects register B via the memory address bus 140. On count 2, the microinstruction ROM 0 is executed. Timing signals are produced to the data memory causing the sign digit of the data signal in the B-register to be transferred to the B-sign store of the B-latch 148 via the bus 160. On count 3 of the first pass, the microinstruction ROM 1 is read and decoded. The memory address register operates to address the A-register 142 via the memory address bus 140. On count 4, microinstruction ROM 1 is executed. The sign digit of the data signal in the A-register 142 is transferred to the A-sign store of the A-latch 146 via the data in bus 160. None of the other counts produce any operation during the first pass.

At the beginning of the second pass, count 1 reads and decodes the microinstruction ROM 2, thereby causing the memory address register to again address the B-register 144. On count 2, microinstruction ROM 2 is executed which causes the first numerical digit of the data signal in the B-register to be transferred to the B-latch 148 via the data-in bus 160. In a similar manner, during counts 3 and 4 of the second pass, microinstruction ROM 3 is read and executed; and the first numerical digit of the data signal contained in the A-register to be transferred to the A-latch 146. On count 5, microinstruction ROM 4 is read and decoded; and the data is modified in the arithmetic unit and written into the A-register. Therefore during count 5, the instruction decode and timing circuit 128 produces signals to set the A-register into a write mode and set the arithmetic unit into an add mode. On count 6 and 7 of the second pass, in executing microinstruction ROM 4, the numerical digits contained in the A and B latches 146 and 148 pass through the complimenters 150 and 152 to the BCD adder 156. On count 8, the digit representing the sum is held in the latch 158. On count 9, the digit held in the latch is transferred via the data-out bus 136 back to the A-register. On pass 3, the arithmetic unit operates on the next numerical digit of the data words in the A and B registers in exactly the same manner as described with reference to pass 2. Therefore, after pass 8, the numerical values represented by the data signals in the A and B registers will have been added together and transferred back into the A-register. On counts 1 and 2, of pass 9, microinstruction ROM 5 is read and executed. In the case of an add macroinstruction, microinstruction ROM 5 is defined as a NOP of that fetch instruction. The same is true for counts 3 and 4 which read and execute microinstruction ROM 6 also a NOP of that fetch instruction. On counts 5 through 9, the data store is set up in a write mode, and the arithmetic unit is set up to determine a new sign. On counts 6 and 7 of pass 9 the new sign is determined; and on count 8, the new sign is stored in the latch 158. On count 9, the new sign passes along data-out bus 136 into the most significant digit of the A-register 142.

The above is only one example of the operation of the data processor in response to a macroinstruction. Given the information in Tables A and B, one who is skilled in the art of computer design will appreciate the operation of the data processor relative to the other macroinstructions described. It should be noted that the above disclosure only recites the transfer of data signals from the data signal devices 100 (see FIG. 4b) on the machine 10 to the data I/O multiplexer 132 via the data interface 65 and data bus 64. As will be appreciated by those who are skilled in the art, the above elements are bidirectional and may be used to transfer data from the data processor to data signal devices on the machine.

At this point the logic processor and data processor have been generally discussed in combination and individually discussed in detail. To help gain an appreciation of how the processors work in combination, a simple practical situation will be examined. One area where the asynchronous dual function multiprocessor control may be applied is in the control of a tool changer mechanism on a machine tool. A tool changer mechanism stores a number of tools in a tool matrix and is operative to interchange tools between the tool matrix and a machine spindle in response to a tool change signal. During the tool change cycle, it is required that a selected tool be in a predetermined matrix position for retrieval by the tool change mechanism. Therefore, during the tool change cycle and at other selected times, it is necessary to move the tool matrix such that the selected tool occupies the predetermined matrix position. This motion of the tool matrix may be initiated by a program or may be manually initiated. Further, the manual controls generally include a control for moving the tool matrix continuously or one position at a time. For purposes of this disclosure, the term tool jog will refer to the motion of the tool matrix one position at a time; and implementation of a tool jog clockwise cycle requiring the logic and data processors will be described in more detail.

Figure 6:
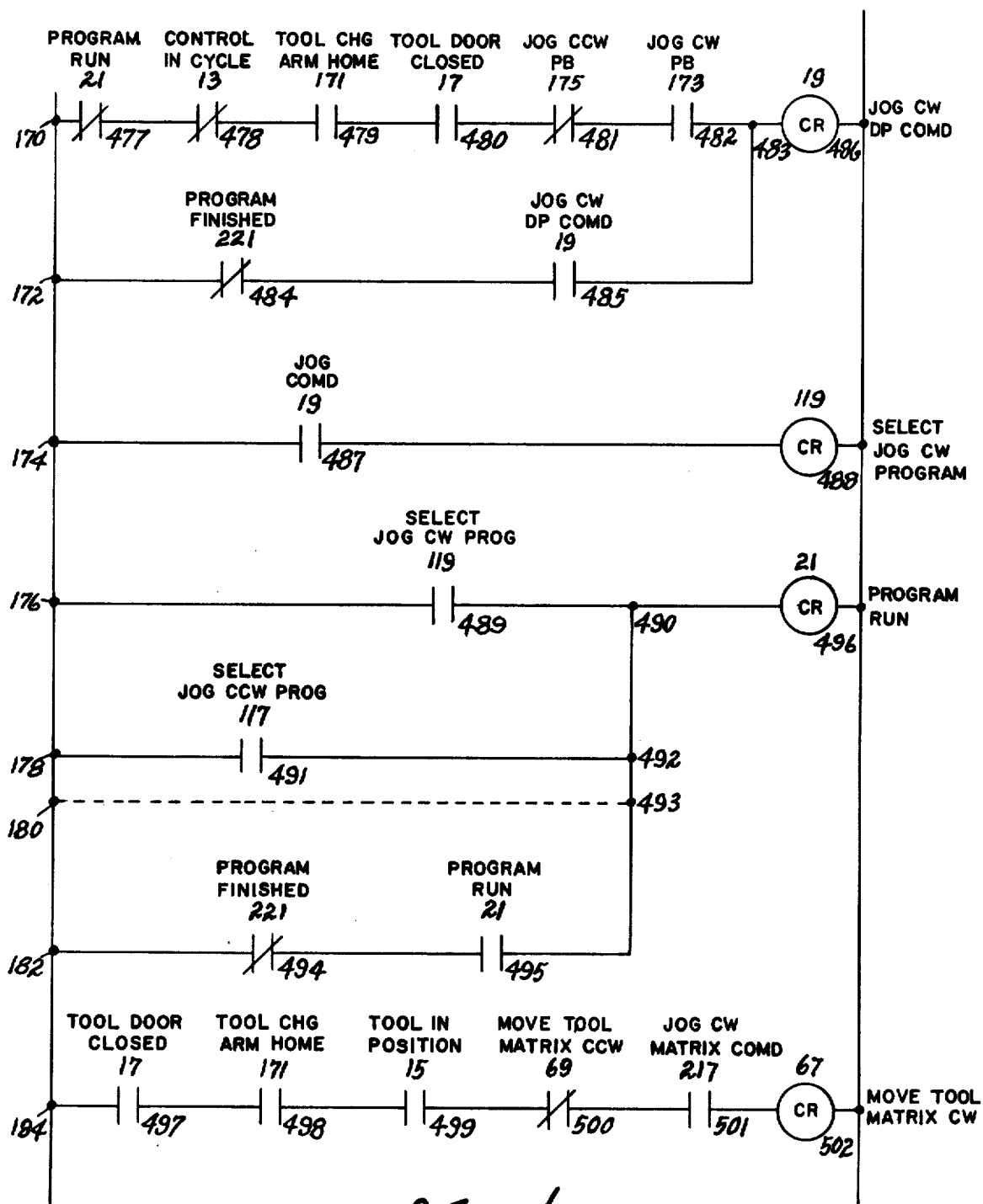
FIG. 6 illustrates an example of a machine control circuit requiring the use of the multiprocessing system.

FIG. 6 illustrates a small portion of a typical tool change mechanism control circuit which controls a tool jog clockwise cycle. The elements of the diagram are assigned numerical addresses in accordance with the address allocations discussed earlier. Further, the number to the lower right of each element defines the memory address of the memory word associated with each element. A program implementing the logical functions of the circuit in FIG. 6 may be generated by a programming unit and transferred to the program store of the logic processor in a manner as described with reference to FIGS. 2 through 4.

In line 170, of FIG. 6, a number of serial conditions are illustrated which must be satisfied before the jog clockwise command signal may be generated. First, if another program is running in the data processor or if the machine tool control is in cycle, the normally closed contacts 21 and 13 prevent the initiation of a jog clockwise cycle. Next, the normally open contacts 171 and 17 require that the tool change arm be in its home position and the door protecting the tool matrix be closed before a jog clockwise cycle begins. Further, if the jog counterclockwise push button is being depressed, the normally closed contact 175 wil prohibit a jog clockwise cycle. If all of the prior conditions are satisfied, depressing the jog clockwise push button will close contact 173 thereby energizing the coil 19 and initiating a jog clockwise cycle.

Energization of 19 CR will close the normally open contacts 19 in line 174 of the diagram thereby energizing the output coil 119. As will be described in more detail, this device address is decoded by the data processor which in turn generates two input signals back to the contact bus for reception by the logic processor. A first signal indicates the program is not finished which closes the normally closed contacts 221 in lines 172 and 182 of FIG. 6. Since 19 CR is picked up, the normally opened contacts 19 are closed, thereby latching 19 CR via the circuit branch 172. The coil 119 has normally opened contacts 119 in the circuit branch 176. These contacts are operative to energize the coil 21 which closes the normally opened contacts 21 in circuit branch 182 thereby latching the coil 21. The energization of coil 21 indicates a program is being run by the data processor, and the normally closed contacts of this coil one of which is illustrated in circuit branch 170 prohibit the generation of any other command requiring the operation of the data processor. An example of such an operation is shown by the normally open contacts 117 in circuit branch 178 which are energized by a jog counterclockwise signal. The circuit branch 180 is shown in phantom and represents all other command signals requiring the execution of a program in the data processor.

Immediately upon the energization of coil 119 selecting a program in the data processor, in addition to the input signal indicating that a program is not finished, i.e. normally closed contacts 221 of circuit branch 182, the data processor also generates an input signal to the contact bus commanding the tool matrix motor to move in the clockwise direction. This signal has a device address corresponding to the address of the normally opened contacts 217 shown in circuit branch 184. If the conditions defined by the serial elements 17, 171, 15 and 69 produce continuity through the circuit branch 184, and if the logic processor decodes the jog motor command signal thereby closing contacts 217, the coil 67 is energized. Energization of coil 67 causes the motor connected to the tool matrix to move the tool matrix in a clockwise direction. This motion is monitored by the program being executed in the data processor; and when the tool matrix is incremented one position in the clockwise direction, the jog motor command is terminated thereby opening contacts 217 and the program finish input signal is generated thereby unlatching the coils 19 and 21.

Figure 7:
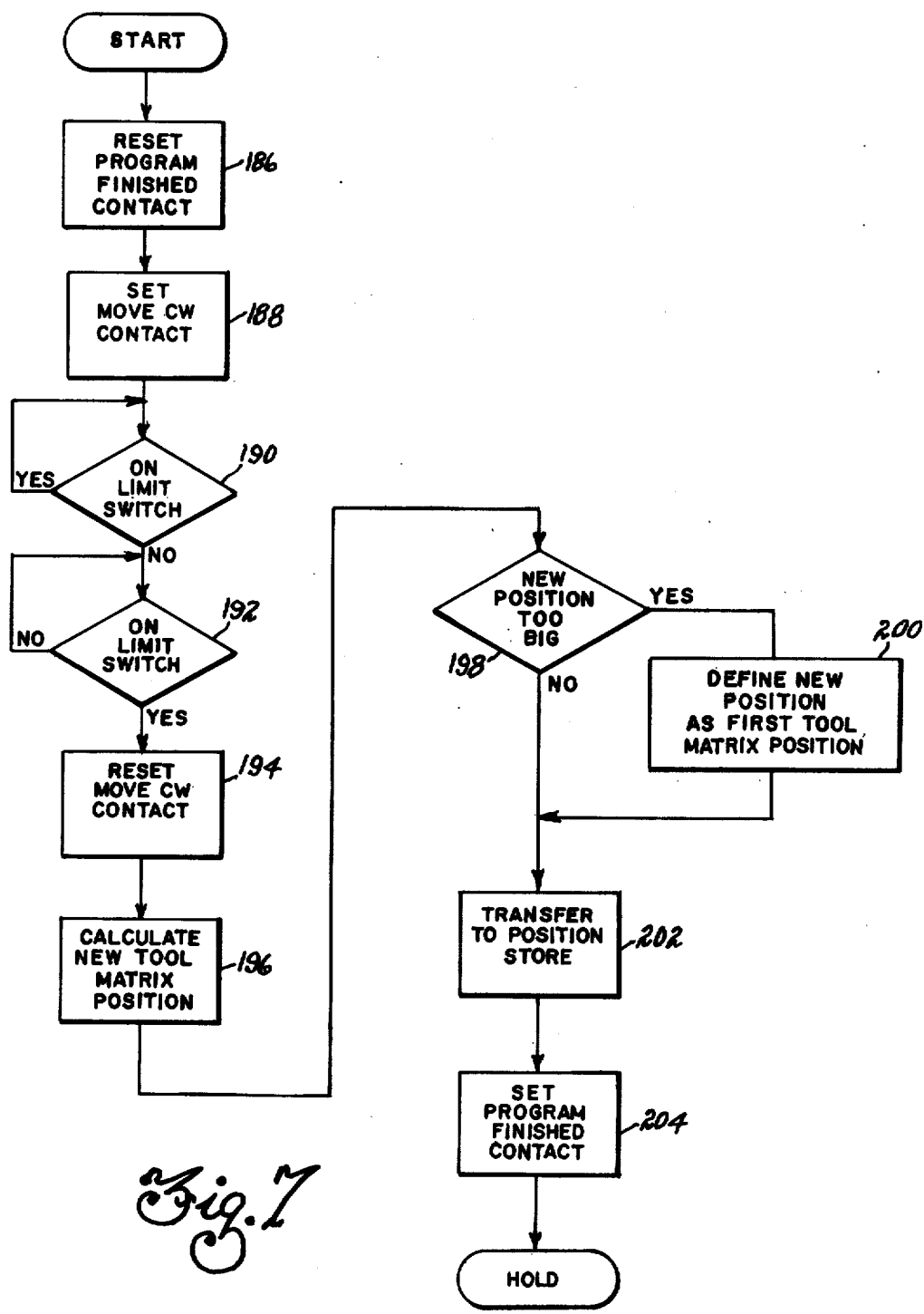
FIG. 7 illustrates a flow chart of a routine for controlling a jog clockwise cycle of a tool matrix.

FIG. 7 is a flow chart of a program to be executed by the data processor during a jog clockwise cycle. After the jog clockwise program has been selected by coil 119, process block 186 is operative to reset the program finished contact 221 thereby permitting the coils 19 and 21 to be latched. Process block 188 sets the jog clockwise contact 217 thereby energizing coil 67 and causing the tool matrix to move in a clockwise direction. When a tool is located in the predetermined matrix position, a limit switch is activated. Decision block 190 determines whether or not the limit switch is activated. If the limit switch is activated, the tool matrix has not moved; and the process loops around decision block 190 until the limit switch is deenergized. Next process decision block 192 again determines whether or not the limit switch is energized. If the limit switch is not energized, the predetermined position is between two tools on the matrix. The process loops around decision block 192 until the decision block determines that the limit switch is again energized. Process block 194 then resets the move clockwise contact 217 causing coil 67 to be deenergized and terminating the tool matrix motion.

To summarize, the tool matrix has been commanded to move; and the data processor program had detected that the limit switch associated with the predetermined matrix position has experienced a deenergizaton and a subsequent enerization thereby indicating that one tool has moved from the predetermined position, and another tool has moved into the predetermined position.

The rest of the flow chart disclosed the necessary steps for calculating the new position of the tool matrix. Generally, this can be accomplished by merely incrementing the old tool matrix position by one. This incrementing process is defined by process block 196. However, the situation may arise where the incremented number is greater than the maximum number of tool matrix positions available. Decision block 198 determines if the new tool matrix position number is too large. If it is, process 200 defines the new tool matrix position as the first tool matrix position. This means that the tool matrix has looped around from its final position number to its first position number. Process block 202 transfers the new tool matrix position to the BCD data memory. Finally, process block 204 sets the programmed finished contact 221 thereby causing the normally closed contacts 221 in circuit branches 172 and 182 of FIG. 7 to open and unlatch the coils 19 and 21 respectively. Unlatching of the coils 19 and 21 completes the jog clockwise cycle of operation.

Table IV below is a coded program implementing the flow chart of FIG. 8.

TABLE IV
JOG C.W. PROGRAM

| Addr. | Instr. | Comment |
|-------|--------|---------|
| 100 | RCC 3 | Reset program finished contact-221 |
| 101 | SCC 0 | Set move CW contact-217 |
| 102 | ITBO | Trans. tool chg. instr. (+000TTFH) to B-reg. |
| 103 | SLB | Shift B-reg. left one digit (+00TTFH0) |
| 104 | CTB | Transfer B-reg. to Mem. Add. Reg. (H0) |
| 105 | CTB | Transfer Mem. Add. Reg. to B-reg (+00000H0) |
| 106 | CZB | Comp. B-reg. to 0; if = 0, skip next instr. |
| 107 | JMP 102 | If B-reg. = 0, Jump to Add. 102 |
| 108 | ITBO | Trans. tool chg. instr. (+000TTFH) to B-reg. |
| 109 | SLB | Shift B-reg. left one bit (+00TTFH0) |
| 110 | BTC | Transfer B-reg. to Mem. Add. Reg. (H0) |
| 111 | CTB | Transfer Mem. Add. Reg. to B-reg. (+00000H0) |
| 112 | CZB | Comp. B-reg. to 0; if = 0, skip next instr. |
| 113 | JMP 115 | If B-reg. + 0, Jump to Add 115 |
| 114 | JMP 108 | If B-reg. = 0, Jump to Add 108 |
| 115 | RCC 0 | Reset move CW contact - 217 |
| 116 | SMAU 0 | Set MSB of Mem. Add. Reg. = 0 |
| 117 | SMAL 4 | Set LSB of Mem. Add. Reg. = 4 |
| 118 | MTB | Move data (Tool Matrix Pos. No.) corres. to Mem. Add. 04 to B-reg. |
| 119 | INB | Incr. B-reg. to define new Tool Matrix Pos. No. |
| 120 | SMAL 2 | Set LSB of Mem. Add. Reg. = 2 |
| 121 | MTA | Move data (Max. Tool Matrix Pos. No.) corres. to Mem. Add. 02 to A-reg. |
| 122 | CMG | Comp. A-reg. to B-reg; if A B, skip next instr. |
| 123 | JMP 125 | A B; Jump to Add. 125 |
| 124 | JMP 127 | A B; Jump to Add. 127 |
| 125 | CLB | Clear B-reg. (+0000000) |
| 126 | INB | Increment B-reg. (+0000001) |
| 127 | SMAL 4 | Set LSB of Mem. Add. Reg. = 4 |
| 128 | BTM | Transfer B-reg. to mem. loc. corres. to Mem. Add. 04 |
| 129 | SCC 3 | Set program finished contact - 221 |
| 130 | JMP 0 | Hold |

The program uses many of the macroinstructions recited earlier in the specification. The definition of these macroinstructions in combination with the comments below should make a detailed explanation of the program unnecessary. there is only one area which requires further explanation. In the implementation of the mechanism processor to a tool change mechanism, it is required to transfer certain information from the contact bus under control of the logic processor to the data bus. This is accomplished by providing an intercommunication circuit 86 between these two buses which contains one or more data registers. The registers are supplied bits of information at appropriate times during the cycle of the logic processor. Further, during the execution of a program in the data processor, the information in these registers may be transferred across the data bus into the data processor.

An example of this interchange is a tool change instruction word which is required by the jog clockwise program illustrated in Table IV above. The tool change instruction is an eight bit word comprise of a sign digit and seven BCD numerical digits. The first digit H defines the status of the limit switch at the predetermined position of the tool matrix. The second digit F defines the first tool in the matrix. The next two digits T define the current tool number. The only digit of interest in the jog clockwise program is the digit H. During each cycle of the logic processor, information bits which define the current state of the limit switch and the current tool information are transferred from the contact bus to an intercommunication circuit, (See FIG. 1). On address 102 of the program, this tool change instruction is transferred from the intercommunication circuit along the data bus into the B-register. Since the jog clockwise program is only concerned with the state of the digit H, i.e. the state of the limit switch steps 103 through 105 isolate the digit H of the tool change instruction. The digit is then compared to zero to determine its state, and the program continues in accordance therewith.

While the invention has been illustrated in some detail, according to the preferred embodiments shown in the accompanying drawings and while the preferred illustrated embodiments have been described in some detail, there is no intention to limit the invention to such detail. On the contrary it is intended to cover all modifications, alterations, and equivalents falling with the spirit and scope of the appended claims.

What is claimed is:

1. An apparatus for controlling a machine, said machine having input devices generating input signals in response to the machine operation and further having output devices for receiving output signals to modify the machine operation, the apparatus comprising:
    a. a single data bit contact bus;
    b. means connected between the contact bus and the devices on the machine for interfacing the input and output signals between the contact bus and the input and output devices, respectively;
    c. a single data bit logic processor means connected to the contact bus and reponsive to the input signals for generating the output signals in response to the machine operating in accordance with a stored set of logic instructions;
    d. a data processor means connected to the contact bus for producing a further input signal by executing asynchronously with the logic processor means a stored set of arithmetic instructions in response to one of the output signals; and
    e. data communication means connected to the data processor means.

2. An apparatus for controlling a machine having input devices for generating input signals representing the actual electrical states of the input devices in response to the machine operation and further having output devices for receiving output signals commanding the electrical state of the output devices to modify the machine operation, the apparatus comprising:
    a. a single data bit contact bus;
    b. means connected to the contact bus and the devices on the machine for interfacing the input and output signals between the contact bus and the input and output devices respectively;

c. a single data bit logic processor means connected to the contact bus and including
  1. means for storing logic instructions representing a pattern of predetermined states of the input signals thereby defining a desired cycle of operation of the machine, and
  2. means responsive to the storing means and connected to the contact bus for producing the output signals in response to the actual states of the devices on the machine corresponding to the predetermined states of said devices;
d. a data processor means connected to the contact bus and operating asynchronously with the logic processor means, said data processor means including
  1. means responsive to one of the output signals for selecting a stored program of arithmetic instructions,
  2. data storage for storing data signals, and
  3. means responsive to the selecting means and the data signals for executing the arithmetic instructions to cause a further input signal to be available on the contact bus for use by said logic processor means; and
e. data communication means connected to the data processor means for transferring the data signals to and from the data processor means.

3. An apparatus for controlling a machine having input devices for generating single bit input signals representing the actual electrical states of the input devices in response to the machine operation, output devices for receiving single bit output signals commanding the electrical state of the output devices to modify the machine operation, and other devices for generating multiple bit data signals, the apparatus comprising:
a. a single data bit contact bus;
b. means connected to the contact bus and the input and output devices for interfacing the input and output signals therebetween;
c. a single data bit logic processor means connected to the contact bus and including
  1. means for storing logic instructions representing a pattern of predetermined states of the input and output devices thereby defining a desired cycle of operation of the machine, and
  2. means responsive to the storing means and connected to the contact bus for producing the output signals in response to the actual states of the devices on the machine corresponding to the predetermined states of said devices;
d. a multiple bit data bus;
e. means connected to the data bus and the other devices for interfacing the data signals therebetween;
f. a plurality of multiple bit data processor means connected to the contact bus and the data bus and operating asynchronously with the logic processor means, each of the data processor means including
  1. means connected to the data bus and the data processor means for transferring the data signals threbetween,
  2. means responsive to one of the output signals for selecting a stored program of arithmetic instructions, and
  3. means responsive to the selecting means and the data signals for executing the arithmetic instructions to cause a further input signal to be available on the contact bus for use by said logic processor means.

4. The apparatus of claim 3, wherein the apparatus further comprises a bulk data store connected to the data bus whereby data signals may be transferred from the bulk data store to any of the data processor means.

5. The apparatus of claim 3, wherein each of the data processor means further comprises a data store for receiving and storing data signals from the transferring means whereby said data signals may be subsequently used by the executing means.

6. An apparatus for controlling the operation of a machine, said machine having input devices for generating single bit input signals representing the actual electrical states of the input devices and output devices for operating the machine in response to single bit output signals commanding the electrical states of the input devices, the apparatus comprising:
a. a single data bit contact bus;
b. means connected to the contact bus and the input and output devices for interfacing the input and output signals therebetween;
c. a single data bit logic processor means connected to the contact bus and including
  1. a memory for storing a series of memory words representing the desired states and device addresses of the input and output devices and logic instructions associated therewith, thereby simulating the desired cycle of operation of the machine,
  2. means for continuously reading the memory words in an iterative fixed sequential cycle to provide the device addresses on the contact bus, and
  3. means connected between the memory and the contact bus for generating the output signals in response to the actual operating conditions on the machine as represented by the input signals corresponding to the desired operating conditions on the machine as represented by the memory words;
d. a data processor means connected to the contact bus and operating asynchronously with the logic processor means, said data processor means including
  1. a program store for storing a number of macroinstruction programs each containing a series of arithmetic instructions,
  2. means connected between the contact bus and the program store for selecting one of the programs in response to one of the output signals,
  3. means responsive to the program store for decoding each macroinstruction ot produce a number of microinstructions and timing signals,
  4. a data store for storing a number of data signals, and
  5. means connected to the data store and the decoding means for executing the microinstructions to generate a control signal to the selecting means thereby causing the data processor means to transmit a further input signal to the contact bus in response to a device address corresponding to the further input signal; and
e. data communication means connected to the data processor for transferring the data signals to and from the data communication means.

7. The apparatus of claim 6, wherein the means for generating the output signals further comprises:

a. means for decoding the memory words to produce input, output and OR element signals, said input and output element signals having device address signals associated therewith;

b. means serially responsive to consecutive memory words having input element signals and first device addresses for comparing desire machine condition as defined by the consecutive memory words with the actual machine conditions as defined by the input signals associated with the first device addresses; and c. means responsive to the decoding and the comparing means for providing an output signal in response to a continuous correspondence between the desired and actual machine conditions and the subsequent decoding of OR element signal or an output element signal, whereby said comparing and providing means operate to execute a logical AND function.

8. The apparatus of claim 7, wherein the means for providing the output signal further comprises:

a. first storage means connected to the comparing means and responsive to the decoding of successive memory words for storing a first signal in response to a continuous correspondence between the desired and actual machine conditions;

b. second storage means connected to the first storage means and the decoding means for storing the first signal and resetting the first storage means in response to an OR element signal; and c. means responsive to the first and second storage means, and the decoding means for producing the output signal in response to the first signal and the beginning of an output element signal and resetting the first and second storage means in response to the end of the output element signal.

9. the apparatus of claim 8, wherein said machine further includes other devices for generating and receiving data signals and the data communication means further comprises:

a. a data bus;

b. means connected to the data bus and the other devices for interfacing the data signals therebetween; and c. means connected between the data bus and the data processor means for multiplexing the signals therebetween.

10. The apparatus of claim 9, wherein the memory is comprised of a nonvolatile electrically alterable readonly memory.

11. The apparatus of claim 10, wherein the selecting means further comprises:

a. means responsive to the one of the output signals and second device addresses for decoding and storing said second device address; and b. a program counter responsive to the stored second device address for setting a predetermined number therein thereby selecting the one of the macroprograms in the program store.

12. The apparatus of claim 11, wherein the data signals represent binary coded decimal numbers and the data store further comprises a binary coded decimal storage circuit.

13. The apparatus of claim 12, wherein the executing means further comprises an arithmetic unit responsive to the binary coded decimal numbers for executing each of said macroinstructions by means of a fixed cycle comprised of a predetermined fixed number of passes through the arithmetic unit with a predetermined fixed number of timing counts per pass.

14. An apparatus for controlling a machine having input devices for generating input signals representing the actual electrical states of the input devices in response to the operation of the machine, output devices for receiving output signals commanding the actual electrical states of the output devices to control the operation of the machine, and other devices for generating and receiving data signals, the apparatus comprising:

a. a single data bit contact bus;

b. an interface circuit connected between the contact bus and the input and output devices for controlling the communication of the input and output signals between the contact bus and said input and output devices;

c. a logic processor including
 1. a logic program storage circuit containing memory words defining a predetermined pattern of desired conditions of the input and output devices and associated device addresses, and
 2. means responsive to the logic program storage circuit and the contact bus for producing the output signals in response to the actual conditions on the machine as represented by the input signals corresponding to the desired conditions as represented by the memory words;

d. a data bus;

e. a data interface circuit connected between the data bus and the other devices for controlling the communication of data signals between the data bus and the other devices;

f. a data processor operating asynchronously with said logic processor and including
 1. a multiplexing circuit connected between the data bus and the data processor for multiplexing the data signals between the data bus and the data processor,
 2. a data store responsive to the multiplexing circuit for storing data signals,
 3. a macroinstruction program store responsive to the contact bus for providing a set of arithmetic instructions in response to one of the output signals and a corresponding device address; and
 4. an arithmetic unit responsive to the data store, the multiplexing circuit and the program store for executing the set of arithmetic instructions using the data signals to cause a further input signal to be provided on the contact bus in response to corresponding device address.

15. The apparatus of claim 2, wherein said machine further includes other devices for generating the data signals and the data communication means further comprises:

a. a data bus for conducting the data signals;

b. means connected between the other devices and the data bus for interfacing the data signals from the other devices to the data bus; and c. means connected between the data bus and the data processor means for transferring the data signals from the data bus to the data processor means.

16. The apparatus of claim 13, wherein the apparatus further comprises an intercommuncation circuit connected between the contact the data buses for converting 1. single data bit output signals from the logic processor means into multiple bit data signals for the data processor means, and 2. multiple bit data signals from the data processor means into single data bit input signals for the logic processor means.

* * * * *